United States Patent [19]

Ullrich et al.

[11] Patent Number: 4,563,326

[45] Date of Patent: Jan. 7, 1986

[54] HIGH TEMPERATURE NUCLEAR POWER PLANT WITH A HOT-GAS PIPELINE WHICH CAN BE SEPARATED FROM THE REACTOR VESSEL

[75] Inventors: Manfred Ullrich, Bergisch-Gladbach; Rainer Sahler, Cologne, both of Fed. Rep. of Germany

[73] Assignee: Interatom Internationale Atomreaktorbau GmbH, Bergisch-Gladbach, Fed. Rep. of Germany

[21] Appl. No.: 498,879

[22] Filed: May 27, 1983

[30] Foreign Application Priority Data

Jun. 1, 1982 [DE] Fed. Rep. of Germany ....... 3220610

[51] Int. Cl.⁴ ............................................ G21C 15/02
[52] U.S. Cl. ................................... 376/292; 376/260; 376/286; 376/393
[58] Field of Search .................... 285/39, 368, 412; 376/260, 286, 291, 292, 381, 391, 393, 392

[56] References Cited

U.S. PATENT DOCUMENTS

| | | | |
|---|---|---|---|
| 586,438 | 7/1897 | Inshaw | 285/39 |
| 3,123,532 | 3/1964 | Michel | 376/381 |
| 3,155,547 | 11/1964 | Siebker | 376/391 |
| 4,036,689 | 7/1977 | Baumgaértner | 376/394 |
| 4,039,377 | 8/1977 | Andrieu et al. | 376/292 |
| 4,093,281 | 6/1978 | Jansen, Jr. | 285/39 |

FOREIGN PATENT DOCUMENTS 3016402 11/1981 Fed. Rep. of Germany .
3038240 5/1982 Fed. Rep. of Germany ...... 376/286

*Primary Examiner*—Deborah L. Kyle
*Assistant Examiner*—Richard W. Wendtland
*Attorney, Agent, or Firm*—Herbert L. Lerner; Laurence A. Greenberg

[57] ABSTRACT

A high-temperature nuclear power plant, includes a reactor, an inner vessel enclosing the reactor, an outer reactor pressure vessel disposed outside the inner vessel, a stub integral with the outer vessel, and a hot gas pipeline disposed in the stub, the improvement comprises a screw connection being releasable from outside the outer vessel for fastening the hot gas pipeline to the inner vessel, and a device connected to the hot gas pipeline for applying a force to the hot gas pipeline in a direction tending to separate the hot gas pipeline from the inner vessel.

2 Claims, 3 Drawing Figures

HIGH TEMPERATURE NUCLEAR POWER PLANT WITH A HOT-GAS PIPELINE WHICH CAN BE SEPARATED FROM THE REACTOR VESSEL

The invention relates to a high-temperature nuclear power plant with an outer reactor pressure vessel having a stub, which encloses a reactor disposed in an inner vessel, and a hot-gas pipeline flanged to the inner vessel in the stub.

Such a device serves for improving a nuclear power plant of the type which has been described in German Published, Prosecuted Application DE-A 30 16 402, corresponding to U.S. Application Ser. No. 280,092, filed July 2, 1981, to which reference is made for the description of the general construction of such a plant. In an alternative construction, the possibility was already shown therein of accomodating a nuclear reactor of the type described above in a steel pressure vessel, while maintaining a certain amount of spacing, such as is also used for well-known pressurized-water reactors. This is a component which is technologically completely under control. In the cited publication, it was assumed that the connection of the core vessel itself to the hot-gas pipeline transporting away the gases heated therein, would be constructed as a simple plug connection. More recent considerations have let to specifying a stronger connecion between the two components and at the same time to a simpler conduction of the gas, while retaining the possibility of separating them for repair purposes.

It is accordingly an object of the invention to provide a high-temperature nuclear power plant with a hot-gas pipeline which can be separated from the reactor vessel, which overcomes the hereinafore-mentioned disadvantages of the heretofore-known devices of this general type, and to construct the connection between the reactor vessel and the hot-gas pipeline in such a manner that the connection betwen the two components can be released without special difficulties by means of remotely controllable tools, while at the same time a gap is provided between the two components to facilitate the disassembly and later reassembly.

With the foregoing and other objects in view there is provided, in accordance with the invention, a high-temperature nuclear power plant, including a reactor, an inner vessel enclosing the reactor, an outer reactor pressure vessel disposed outside the inner vessel, a stub integral with the outer vessel, a hot-gas pipeline disposed in the stub, a screw connection being releasable from outside the outer vessel or the stub for fastening the hot-gas pipeline to the inner vessel, and means connected to the hot-gas pipeline for applying a force to the hot-gas pipeline in a direction tending to separate the hot-gas pipeline from the inner vessel.

The need for disassembling parts in the annular gap between the outer and inner vessel, which could only be carried out with difficulty, is eliminated. Since the hot-gas pipeline is equipped with devices for compensating the thermal expansion occuring between the normal and the operating temperature, the device required in this case need only supply a force sufficient to overcome the deformation resistance of the compensators in order to separate the flange of the pipeline from the flange at the inner vessel by the required small amount.

In accordance with a concomitant feature of the invention, the inner vessel has a first flange integral therewith, the hot-gas pipeline has a second flange integral therewith, and the flanges are fastened to each other by the screw connection in a tapped hole formed in the first flange and a through hole formed in the second flange, and including a ring disposed between the flanges and supported axially resiliently relative to the second flange, the ring having a tapped hole formed therein fitting the screw connection. This embodiment of the invention serves for a more exact guidance of the screws interconnecting the two components to facilitate reassembly, which is ensured only if the screws in both flanges are guided into threads. To this end, the parts of the flanges provided with threads must be spaced apart from each other by an exact multiple of the screw pitch, which can be accomplished without difficulty by a resilient disposition of one thread.

Other features which are considered as characteristic for the invention are set forth in the appended claims.

Although the invention is illustrated and described herein as embodied in a high-temperature nuclear power plant with a hot-gas pipeline which can be separated from the reactor vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
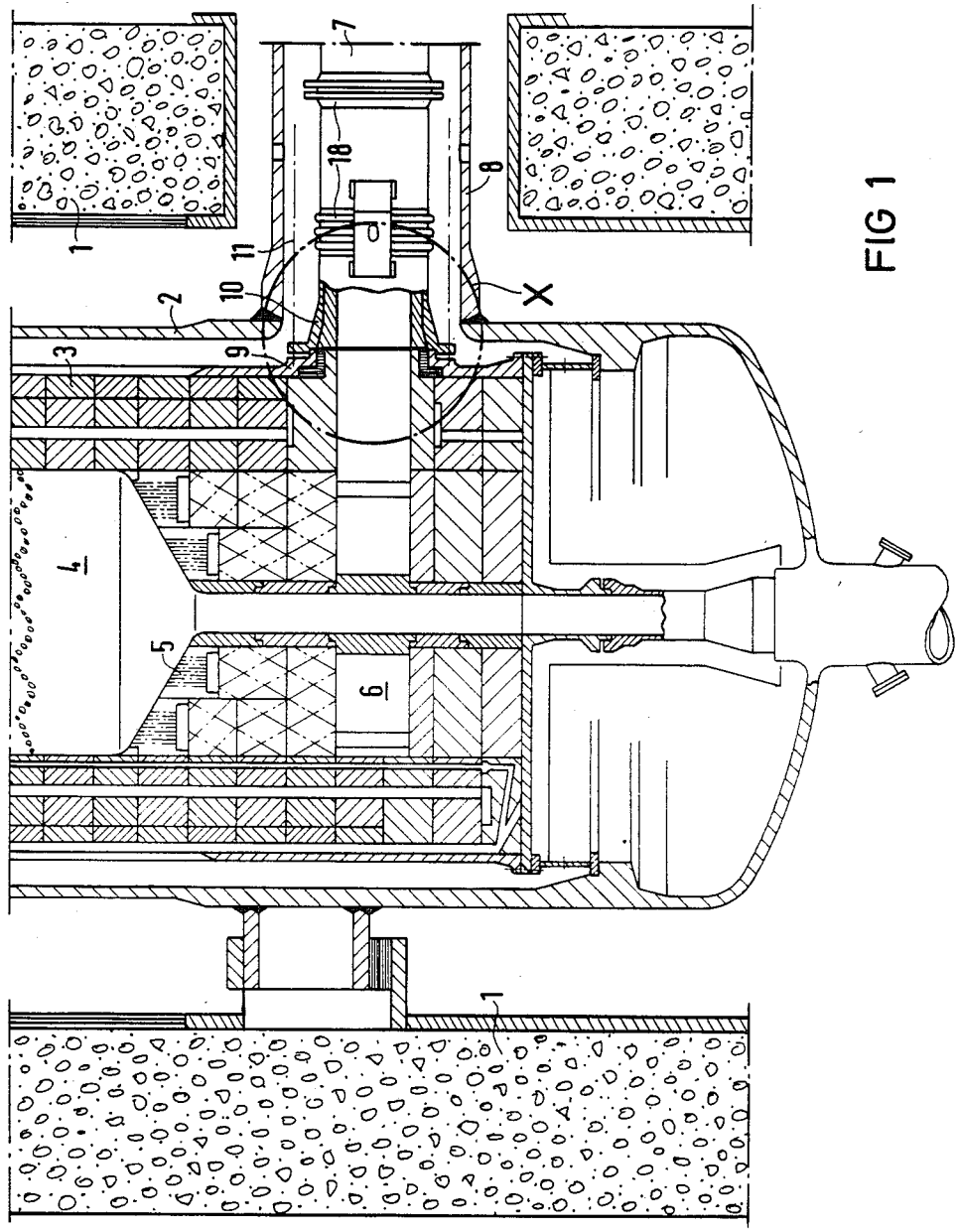
FIG. 1 is a diagrammatic, cross-sectional view, partly broken away, of the lower part of a nuclear power plant under discussion, which is the part necessary for an understanding of the invention.
Figure 2:
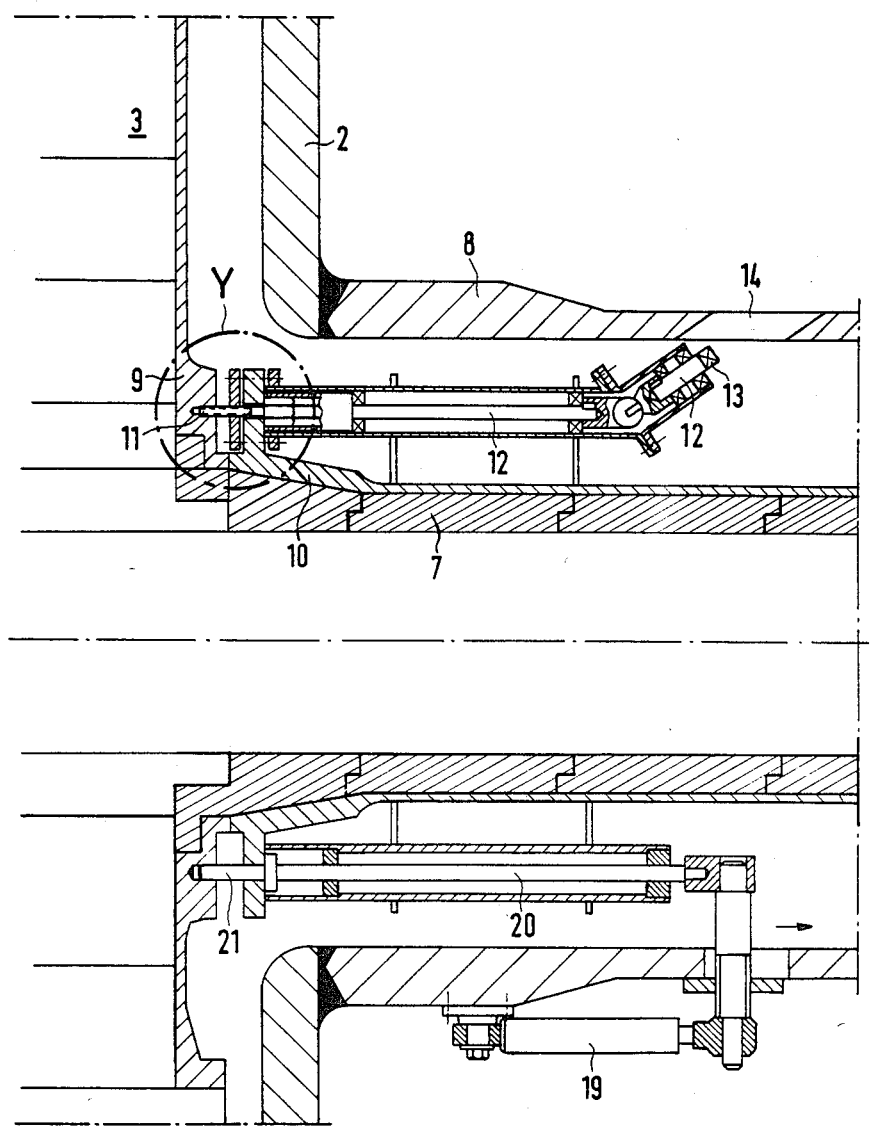
FIG. 2 is a view of the area within the dot-dash circle X of FIG. 1, on an enlarged scale.
Figure 3:
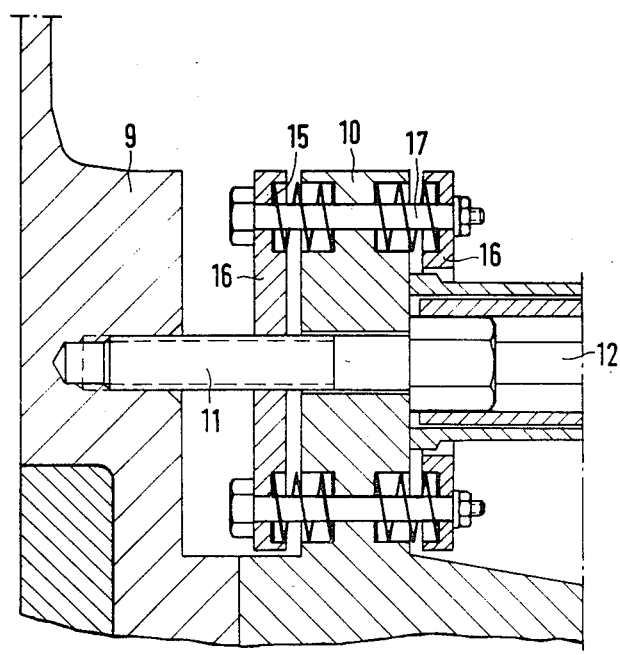
FIG. 3 is a view of the area within the dot-dash circle Y of FIG. 2 on an even larger scale.

Referring now to the figures of the drawing and first particularly to FIG. 1 thereof, there is seen a nuclear power plant which includes, among other things, an outer steel pressure vessel 2 disposed within a concrete shield 1. Within the pressure vessel 2 and spaced therefrom by an annular gap, there is seen an inner vessel 3 which is constructed of graphite and carbon blocks with a metallic enclosure. The inner vessel 3 represents the core vessel proper. The inner vessel 3 contains a core assembly 4 formed of spherical fuel assemblies, for example, through which a gas, such as helium, serving as a heat transfer medium flows from the top down, the gas being heated up in the process. Through a multiplicity of small holes 5 formed in the bottom of the vessel, the gas is finally transported into a plenum 6 from which it is fed through a hot-gas pipeline 7 to non-illustrated heat-consuming parts of the installation, such as a heat exchanger. The hot-gas pipeline 7 is accomodated in stub 8 welded to the outer vessel 2, likewise leaving an annular gap therebetween. The stub 8 is part of an intermediate vessel tightly connecting the pressure vessel 2 to a non-illustrated component container, which may be used for containing heat exchangers, for example. The inner vessel 3 and the hot-gas pipeline 7 are provided with matching flanges 9 and 10, respectively, which are held together during operation of the device by screws 11 distributed over the circumference. FIG. 2 shows more clearly that the screw 11 can be put into rotation in the desired direction by means of an angled-off universal shaft 12. The shaft 12 has an end 13 oriented toward an opening 14 which is formed in the stub 8 for this purpose and is closed during operation by a cover in such a manner that a suitable, remotely controlled tool can be applied from the outside of the pressure vessel 2; neither the cover nor the tool are illustrated in the drawing. In the vessel flange 9, the screws 11 engage a corresponding tapped blind hole, while in the pipe flange 10, they are guided with play in a simple through hole. To ensure exact alignment of the screws 11, a double ring 16 is provided as shown in FIG. 3. The ring 16 is disposed on both sides of the flange 10 and is supported relative to the flange 10 by springs 15. The halves of the ring 16 are rigidly connected together by screws 17. The part of the ring 16 disposed between the two flanges 9, 10 is provided with a tapped hole fitting the screw 11. Due to the resiliency of the springs 15, a spacing which is a multiple of the screw pitch of the screw 11, adjusts itself automatically between the flange 9 and the ring 16, so that the screw is not only exactly guided during installation operations but also runs into the thread to be met in the flange 9 without difficulty. For compensating the thermal expansion occuring between the rest condition at ambient temperature and the operating condition at about 900° C. (inside) and about 300° C. (metallic outer pipe and compensators), the hot gas line 7 is equipped with corrugated tube compensators 18 which present a defined resistance to an axial displacement of the pipe flange 10 away from the vessel flange 9, as shown in FIG. 1. For overcoming this force, hydraulic cylinders 19 are provided which are likewise uniformly distributed over the circumference of the stub 8 and are therefore more easily accessible for maintenance and repair work, as shown in FIG. 2 (the cylinders 19 are removed during the operation of the reactor). Feed lines and control devices, etc., are not shown in the drawings for reasons of clarity. Motion toward the pipe flange 10 and therefore toward the pipeline itself, along the direction indicated by the arrow, is transmitted through a linkage 20; the deformation resistance of the bellows-type compensators 18 must be overcome in this case. Thus, a gap facilitating the disassembly and assembly of the core vessel 3 is created between the core vessel 3 and the hot-gas pipeline 7. The ends of the linkage 20 are constructed as centering pins 21 which center the pipe flange 10 in holes provided for this purpose in the vessel flange 9 during reassembly, and thus permit the initiation of an operation for bolting the two parts together.

The foregoing is a description corresponding in substance to German Application P 32 20 610.0, dated June 1, 1982, the International priority of which is being claimed for the instant application, and which is hereby made part of this application. Any discrepancies between the foregoing specification and the aforementioned corresponding German application are to be resolved in favor of the latter.

We claim:

1. In a high-temperature nuclear power plant, including a reactor, an inner vessel completely enclosing said reactor except for an opening formed in said inner vessel, an outer metallic reactor pressure vessel disposed outside said inner vessel, a stub integral with said outer vessel, and a hot gas pipeline disposed in said stub, the improvement comprising a screw connection inside the outer vessel for fastening the hot gas pipeline to the inner vessel at said opening, means accessible from outside the outer vessel for releasing said screw connection from outside the outer vessel, and means connected to the hot gas pipeline for applying a force to the hot gas pipeline separating the hot gas pipeline from the inner vessel after said screw connection has been released.

2. Power plant according to claim 1, wherein said inner vessel has a first flange integral therewith, said hot gas pipeline has a second flange integral therewith, and said flanges are fastened to each other by said screw connection in a tapped hole formed in said first flange and a through hole formed in said second flange, and including a ring disposed between said flanges and supported axially resiliently relative to said second flange, said ring having a tapped hole formed therein for said screw connection.

* * * * *